United States Patent [19]

Law et al.

[11] Patent Number: 5,059,757

[45] Date of Patent: Oct. 22, 1991

[54] GAS SHROUDED ELECTRODE FOR A PLASMA CARBURIZING FURNACE

[75] Inventors: Trevor J. Law, Cambridge; Richard E. Andrews, Essex, both of United Kingdom; Christopher A. Gall, Chalfont, Pa.

[73] Assignee: Abar Ipsen Industries, Inc., Feasterville, Pa.

[21] Appl. No.: 440,660

[22] Filed: Nov. 24, 1989

[51] Int. Cl.[5] .......................... B23K 9/00; H01B 17/26

[52] U.S. Cl. ................................. 219/121.52; 55/120; 174/15.3; 373/114; 219/121.43; 219/121.36

[58] Field of Search ...................... 219/121.36, 121.52, 219/12.48, 121.43, 121.41, 121.42; 156/345; 315/111.21, 111.61, 111.51; 313/231.21, 231.31; 55/108, 120; 174/15.3, 211; 373/110, 111, 112, 113, 114

[56] References Cited

U.S. PATENT DOCUMENTS

| | | | |
|---|---|---|---|
| 1,264,674 | 4/1918 | Molles | 174/31.5 |
| 1,905,751 | 4/1933 | Rankin | 174/15.3 |
| 3,305,619 | 2/1967 | Molstedt et al. | 174/15.3 |
| 3,809,794 | 5/1974 | Jacobs | 174/31.5 |
| 4,587,458 | 5/1986 | Davenport et al. | 315/111.01 |
| 4,608,698 | 8/1986 | Molle et al. | 373/114 |
| 4,760,584 | 7/1988 | Jones | 373/112 |

FOREIGN PATENT DOCUMENTS 1440661 7/1971 Fed. Rep. of Germany .

OTHER PUBLICATIONS

*Plasma Carburizing-Facility Design and Operating Data*, Graham Legge, Industrial Heating (Mar., 1988).

*Primary Examiner*—M. H. Paschall

*Attorney, Agent, or Firm*—Dann, Dorfman, Herrell and Skillman

[57] ABSTRACT

An electrode for a plasma carburizing furnace is disclosed which is adapted to provide a dynamic gas shroud for inhibiting the buildup of carbon soot on the insulating elements of the electrode. The reduction of carbon soot buildup on the insulating components dramatically reduces the frequency of electrical short-circuits across the insulating component, thereby increasing the availability of the furnace for processing of workpieces.

13 Claims, 6 Drawing Sheets

GAS SHROUDED ELECTRODE FOR A PLASMA CARBURIZING FURNACE

FIELD OF THE INVENTION

This invention relates to a plasma carburizing furnace and in particular to an electrode for such a furnace which is resistant to short circuits due to excessive soot deposited thereon during the carburizing process.

BACKGROUND OF THE INVENTION

The known process of plasma or gaseous ionic carburizing is used to produce a hard surface layer on steel parts. A known process of plasma carburizing involves heating a workpiece in a vacuum furnace to a temperature in the range of about 850–1000° C. The vacuum furnace outer wall is connected to a ground potential whereas the workpieces in the furnace chamber are connected to a source of large negative voltage. When the negative voltage source is energized an electric field is established in the furnace chamber. The workload of steel parts is effectively a cathode and the furnace chamber wall is the anode. A process gas formed of a gaseous mixture containing a carbonaceous gas such as propane or methane flows through the furnace chamber at subatmospheric pressure. The carbonaceous gas is ionized by the influence of the strong electric field. Positive carbon ions are drawn to, absorbed, and diffused into the surface layer of the cathodic steel workpiece.

The workpieces must be insulated from the anodic furnace chamber wall to prevent short circuiting of the electrical system. The workload is usually loaded onto a workpiece table which is supported on one or more electrodes. During the plasma carburizing process carbon soot is deposited on the surface of the ceramic insulators used in the electrodes. The carbon soot develops from both thermal and ionic breakdown of the carbonaceous gas. In time, the carbon soot deposited on an electrode builds up to a level which causes a short circuit over the ceramic insulator, resulting in interruption of the process. Significant and undesirable time delays can occur while the soot is cleaned from the insulators.

SUMMARY OF THE INVENTION

The aforementioned problems associated with soot deposition in known plasma carburizing furnaces are solved by a gas shrouded electrode which includes a conductive element extending from a collar mounted from the vessel rigid enclosure. An insulating pedestal is disposed within the collar for supporting the conductive element and electrically isolating it from the rigid enclosure. The insulating pedestal is dimensioned and positioned within the collar so as to provide a first annular space between the pedestal and the collar. The conductive element is dimensioned and positioned within the collar so as to provide a second annular space between the conductive element and the collar. A gas conduit is connected through an opening in the collar that communicates with the first annular space so that a shrouding gas can be injected into the first annular space. In operation, the injected gas flows through the first annular space into and through the second annular space thereby sweeping the top surface of the insulating pedestal and providing a dynamic gas shroud in the annular spaces for preventing the deposition of soot on the insulating pedestal.

Here and throughout this application the term electrode includes a conducting element together with any associated insulating means, unless otherwise specified. An electrode for purposes of this invention may be directly energized from a source of electric energy, or may be indirectly energized, for example, when used as a support column for the workpiece table in the furnace.

BRIEF DESCRIPTION OF THE DRAWINGS

The foregoing summary, as well as the following detailed description of a preferred embodiment of the present invention, will be better understood when read in conjunction with the appended drawings, in which.

DETAILED DESCRIPTION

Figure 1:
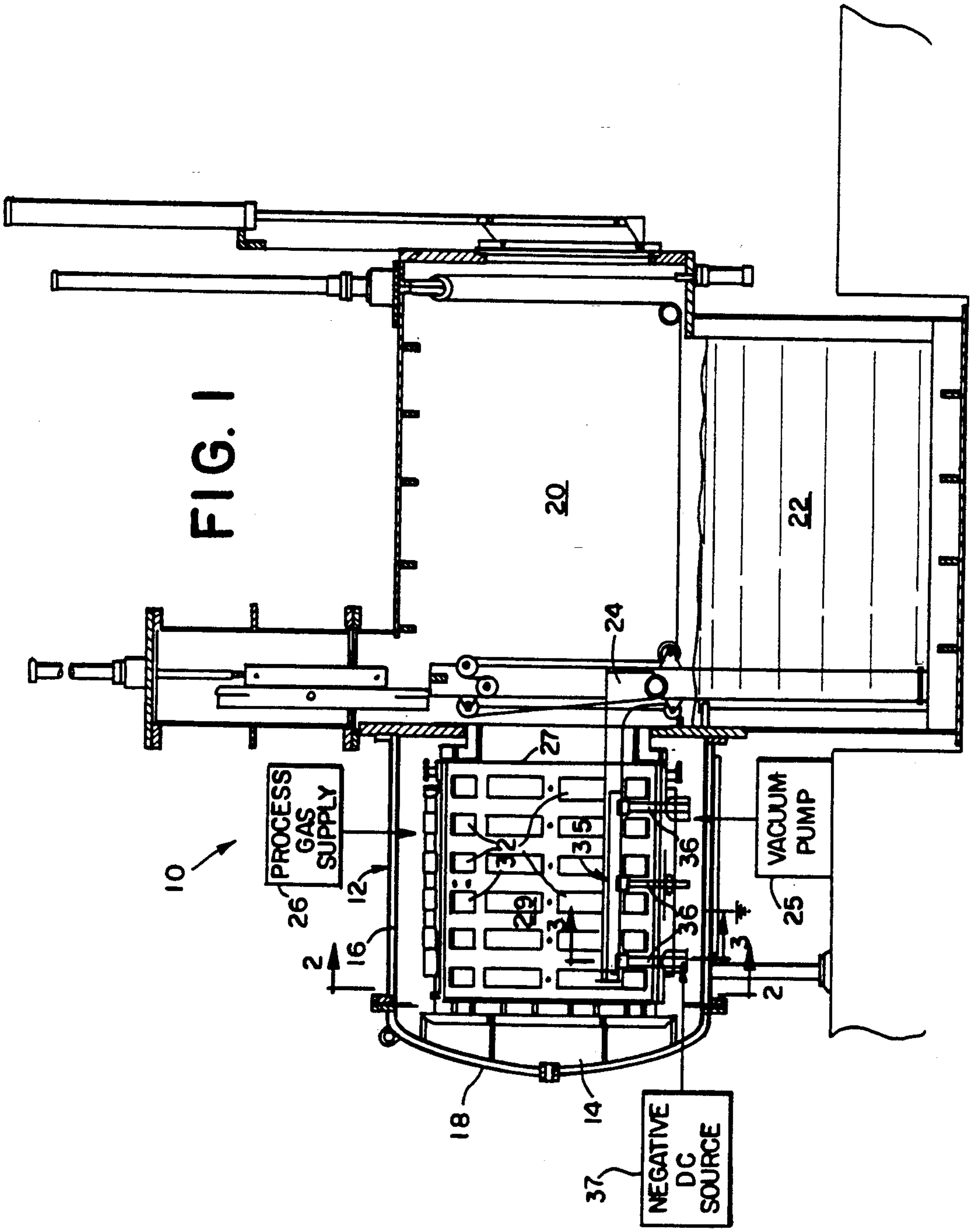
FIG. 1 is a partly schematic view, partially in section, showing a plasma carburizing furnace of the type to which the present invention applies.
Figure 2:
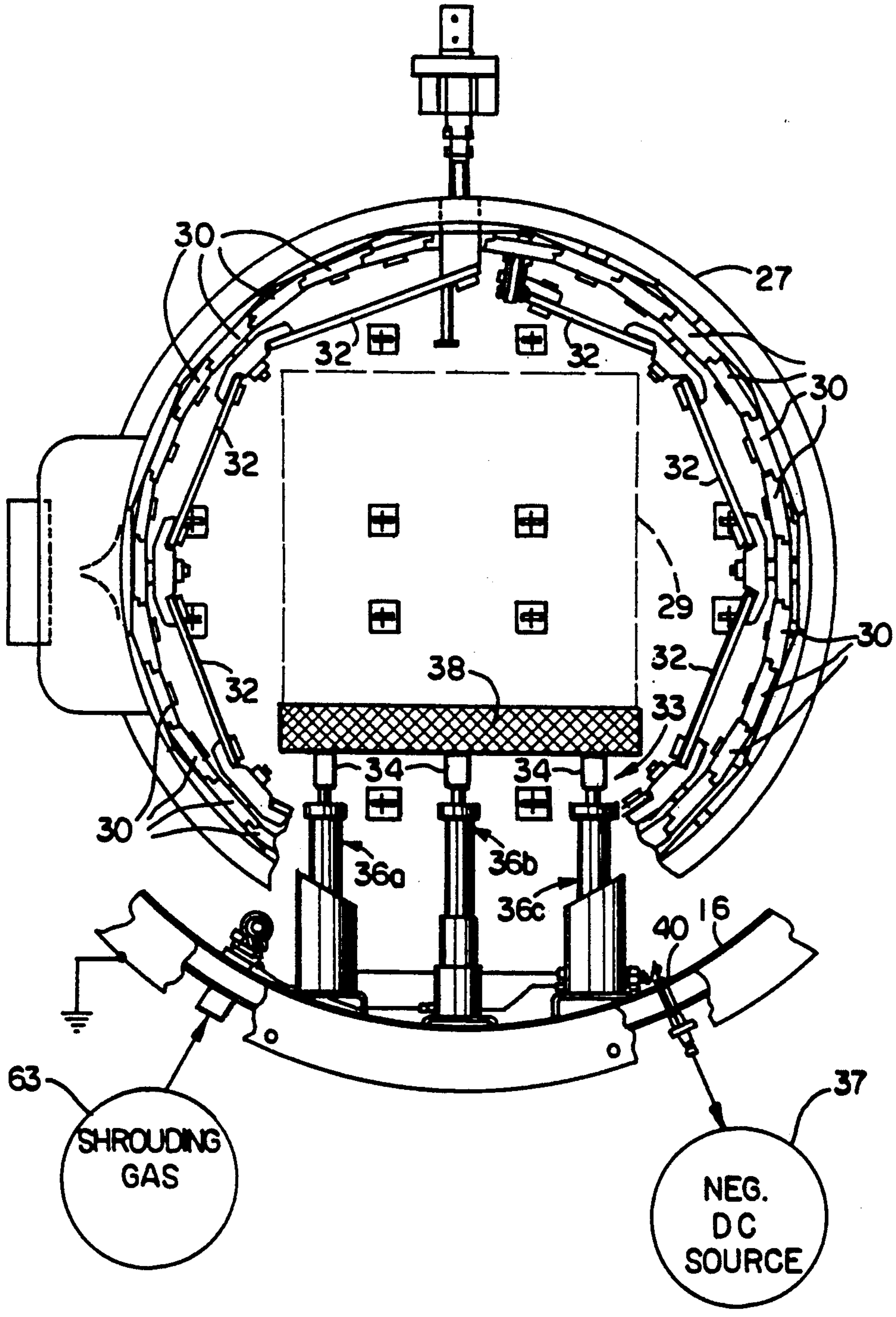
FIG. 2 is an end view of the furnace of FIG. 1 as seen along section line 2—2 in FIG. 1.

Referring now to the drawings wherein like reference numerals refer to the same or similar components across the several views, and in particular to FIGS. 1 and 2, there is shown generally a vacuum heat treating furnace 10 of the type to which the present invention applies. The vacuum heat treating furnace 10 includes a vacuum vessel 12 having a vacuum treating chamber 14 enclosed by a generally cylindrical rigid wall 16 and a sealable door 18 for providing access to the vacuum treating chamber 14. The vacuum heat treating furnace 10 in the embodiment shown can include a quenching chamber 20 containing a quenching medium 22. A load transfer mechanism 24 is movable between the vacuum treating chamber 14 and the quenching chamber 20. Doors and door operating mechanisms are provided in a known configuration to isolate the vacuum treating chamber 14 from the quenching chamber 20 and the quenching chamber 20 from the ambient atmosphere.

A vacuum pump 25 is connected to the vacuum vessel 12 for providing a sub-atmospheric pressure in the vacuum treating chamber 14. A source of process gas 26, such as a carburizing gas, is also connected to the vacuum vessel 12 to supply the process gas to the vacuum treating chamber 14.

Within vacuum vessel 12 there is a generally cylindrical enclosure 27 which defines a hot zone 29. The interior surface of enclosure 27 is covered with an insulating medium 30 to retain heat in the hot zone 29. Heat is supplied during processing by a plurality of heater elements 32 disposed inboard of the insulating medium 30 around the internal surface of enclosure 27.

Figure 3:
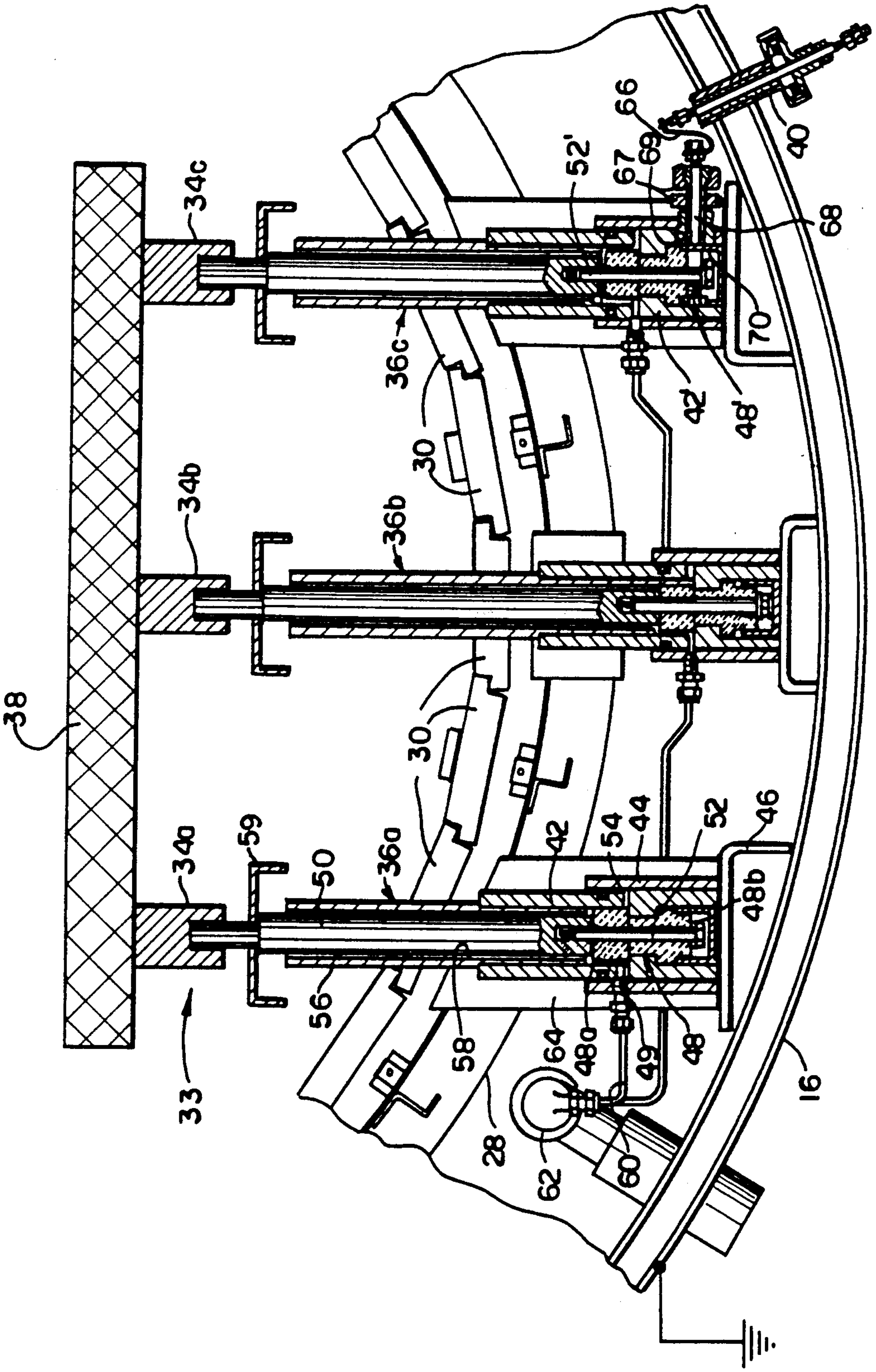
FIG. 3 is a partial section view of the furnace of FIG. 1 as seen along section line 3—3 therein, illustrating the internal construction of the electrode according to the present invention.

A workpiece table 33 for supporting metallic workpieces to be processed in the vacuum heat treating furnace 10 is mounted within the hot zone 29. As shown in FIGS. 2 and 3, the workpiece table 33 is embodied as three (3) support rails 34*a*, 34*b*, and 34*c*. The support rails 34*a–c* are supported from the cylindrical rigid wall 16 by means of electrodes 36*a*, 36*b*, and 36*c* which extend inwardly therefrom. One of the electrodes 36*c* is connected to a negative D.C. voltage source 37 through an electrical bushing 40 in the rigid wall 16. The electrodes 36*a*, 36*b*, and 36*c* are designed to isolate the workpiece table 33 from the rigid wall 16 of vacuum vessel 12 which is connected to ground potential.

Figure 3A:
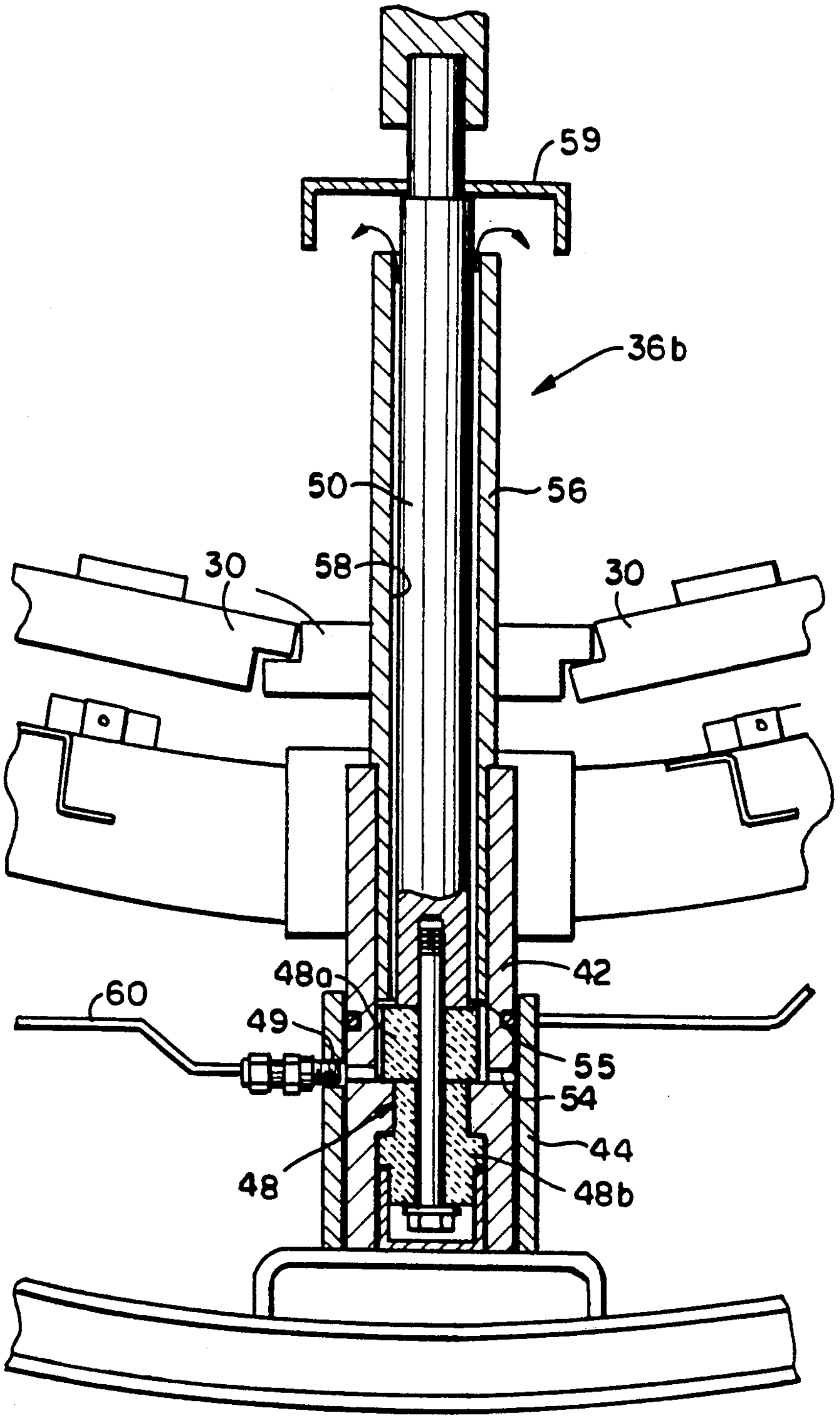
FIG. 3A is an enlarged detailed view of one of the gas shrouded electrodes according to the present invention shown in FIG. 3.

Referring now to FIGS. 3 and 3A, the internal construction of electrodes 36*a*, 36*b*, and 36*c* is shown in greater detail. Electrode 36*a*, which is typical, includes a collar 42 formed of a heat resistant material which can be a metallic material such as stainless steel or, preferably, electrically insulating material, such as a ceramic material. A cup-like support 44 is mounted to the rigid wall 16 of vacuum vessel 12 by a mounting bracket 46 which is attached thereto. The cup-like support 44 is dimensioned to hold the collar 42 in place. A pedestal insulator 48 is disposed inside the collar 42 for supporting a conductive element such as rod 50 on which is mounted the support rail 34*a*. The conductive rod 50 is preferably formed of a heat resisting metallic material such as molybdenum. The conductive rod 50 is attached to the pedestal insulator 48 by means of a fastener such as connecting bolt 52.

Pedestal insulator 48 has an upper segment 48*a* and a lower segment 48*b*. The upper segment 48*a* is dimensioned and positioned within collar 42 to provide an annular space 54 between the interior surface of collar 42 and the upper segment 48*a* of pedestal insulator 48. This arrangement is shown more clearly in FIG. 3A.

A shield 56 is preferably mounted in the collar 42 such that one end is located a small distance from the upper segment 48*a* of pedestal insulator 48. The small distance between the end of shield 56 and the pedestal insulator 48 is selected to provide an annular space 55 between the end of conductive rod 50 and collar 42. The shield 56 surrounds the conductive rod 50, and inhibits the deposit of carbon on the conductive rod 50 when the furnace is in operation. Shield 56 is generally cylindrical and is dimensioned and positioned with respect to the conductive rod 50 to provide a second annular space 58 between the conductive element 50 and the interior surface of shield 56. The shield 56 is preferably made of a conductive material such as graphite because the carbon soot which forms in the plasma carburizing atmosphere is less likely to form in large flakes on graphite. Large flakes of the carbon soot can deposit on the insulator pedestal and cause electrical short circuits between the anodic and cathodic elements in the electrode.

A cover 59, which is generally in the form of an inverted cup, is mounted to an upper portion of the conductive rod 50. The inside diameter of cover 59 is greater than the outside diameter of shield 56. The cover 59 is positioned on conductive element 50 between the end of shield 56 and the support rail 34 so as to prevent carbon soot which forms during operation of the carburizing furnace from falling into the annular space 58.

During operation of the vacuum heat treating furnace 10 according to the present invention a shrouding gas flow is introduced in the annular spaces 54 and 58 by injecting a gas into the annular space 54. To this end a borehole 49 is provided through the collar 42 and cup-like support 44. Gas tubing 60 is adapted at one end to be connected to the borehole 49, and is connected to a gas manifold 62 on the other end. The gas manifold 62 is connected through the rigid wall 16 to a source of shrouding gas 63.

The shrouding gas can be an inert gas such as argon or nitrogen. However, hydrogen is preferred as the shrouding gas because, in addition to providing the sweeping action necessary to prevent deposition of carbon soot on the insulator pedestal, it helps to prevent plasma formation in the annular space 58 thereby further reducing the risk of carbon deposition in the protected area. Methane has also provided good results as a shrouding gas in the present invention.

One of the electrodes 36*c* is adapted to be connected directly to the negative D.C. voltage source 37. A bushing 67 having a central conductor 68 is mounted in a borehole 69 through collar 42′ of the electrode 36*c*. The central conductor 68 extends through the pedestal insulator 48′ for connection with the connecting bolt 52′. The other end of central conductor 68 is connected to the bushing 40 by means of a conducting link 66 such as a braid, wire, or strip made of an electrical conductor such as copper.

Figure 4:
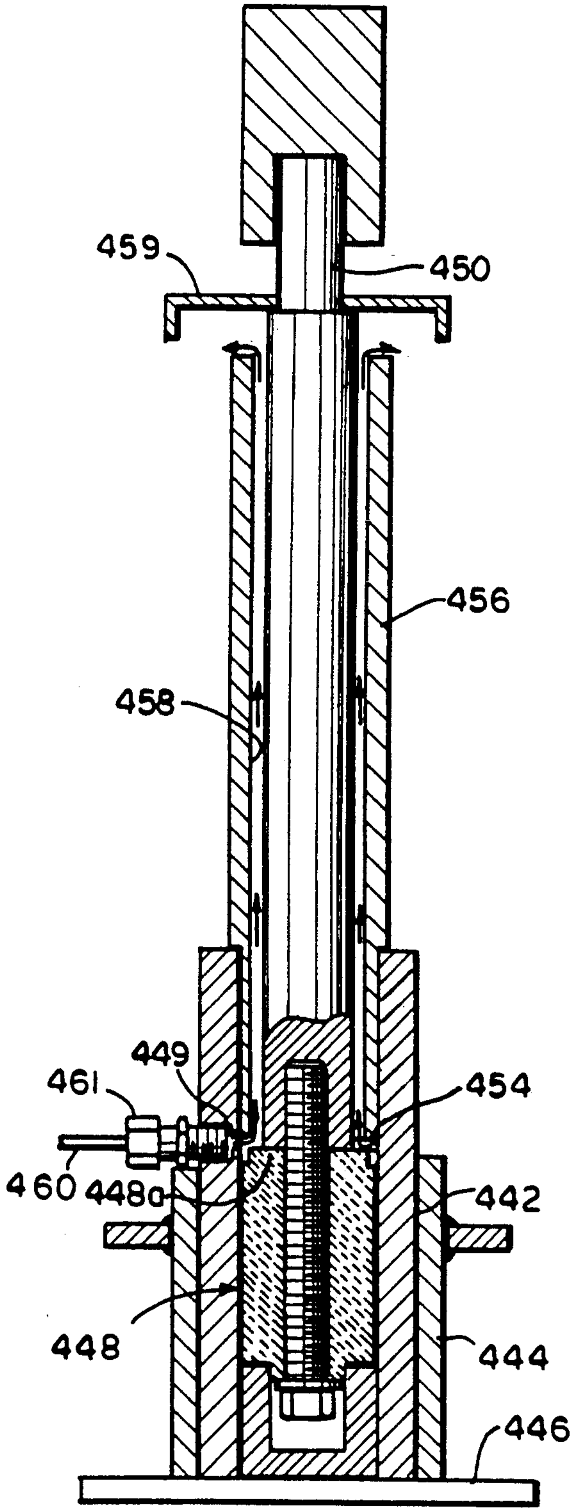
FIG. 4 shows an additional embodiment of the gas shrouded electrode according to the present invention.

Referring now to FIG. 4 there is shown an additional embodiment of an electrode according to the present invention. In this embodiment, a collar 442 is supported in a cup-like support 444 attached to a mounting bracket 446.

In the embodiment shown in FIG. 4 the pedestal insulator 448 is formed of a unitary body of electrically insulating material. The pedestal insulator 448 has a tapered portion 448*a* having a slightly smaller diameter than the lower portion 448*b*. The tapered portion 448*a* of pedestal insulator 448 provides an annular space 454 between the interior surface of collar 442 and pedestal insulator 448. A shield 456 surrounding the conductive rod 450 is mounted in the collar 442 such that its end is a small distance from the tapered end 448*a* of pedestal insulator 448. A gas supply tube 460 is connected by means of a gas tube fitting 461 in a borehole 449 through collar 442. The borehole 449 through collar 442 in the embodiment of FIG. 4 is located beyond the end of cup support 444 such that it terminates in the annular space 454. In this manner gas can be injected directly into the annular space 454, and flow into and through the annular space 458 between the shield 456 and the conductive rod 450 in order to prevent the deposition of carbon soot on the top of pedestal insulator 448.

Figure 5:
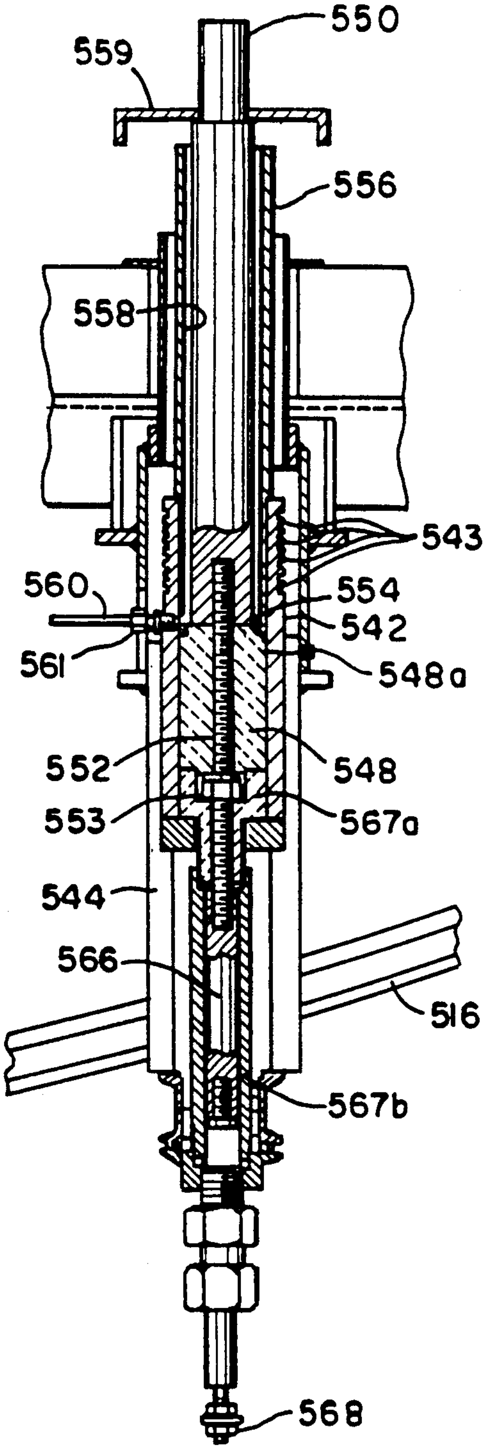
FIG. 5 shows a further embodiment of the gas shrouded electrode according to the present invention.

A further embodiment of the electrode according to the present invention as shown in FIG. 5 is adapted to be connected directly to an external voltage source or ground. An insulating collar 542 is supported in a mounting fixture 544 which is attached to and penetrates the rigid wall 516. Insulating collar 542 has parallel circumferential ridges 543 formed in the outer surface thereof that extends beyond the end of mounting fixture 544.

A pedestal insulator 548 disposed within the insulating collar 542 has a tapered end 548*a* that is dimensioned so as to provide an annular space 554 between the pedestal insulator 548 and the interior surface of collar 542. A conducting rod 550 extends partially into the insulating collar 542 and butts against pedestal insulator 548. A connecting bolt 552 and locknut 553 fasten the conducting rod 550 to the pedestal insulator 548.

A shield 556 extends from the collar 542 and surrounds the conducting rod 550. As in the other embodiments the shield 556 is dimensioned and positioned around conducting rod 550 so as to provide an annular space 558 between the rod 550 and the interior surface of the shield 556.

An electrical path through the rigid wall 516 includes a conducting lead 566 which is threaded onto or otherwise coupled to the connecting bolt 552. An insulating bushing composed of an upper insulator 567*a* and a lower insulator 567*b* electrically isolates the conducting lead 566 from the mounting fixture 544, and hence from the rigid wall 516.

A terminal connector 568 is formed at the external end of mounting fixture 544 and electrically coupled to the conducting lead 566. An electrical lead from a voltage source or from a ground can be readily connected to the terminal connector 568.

Operation of the gas shrouded electrode according to the present invention is readily understood from the following description when read in connection with the drawings. For example, in the embodiment shown in FIGS. 3 and 3A, the shrouding gas is injected from the gas tubing 60 into the annular space 54 through opening 49. The shrouding gas flows up around the upper portion 48*a* of the pedestal insulator 48 to the upper annular region 55. The upper annular region 55 communicates with the second annular space 58 between the shield 56 and conductive rod 50. The shrouding gas flows from the upper annular region 55 into the annular space 58 as indicated by the arrows. The flow of the shrouding gas provides a sweeping or lifting action which inhibits carbon soot produced during the gas carburizing process from falling through the annular space 58 and onto the top surface of the pedestal insulator 48.

In the embodiments shown in FIGS. 4 and 5 the shrouding gas is injected directly into the annular space between the insulator 448, 548 and the end of shield 456, 556. In this manner, the shrouding gas blows directly across the top of insulator 448, 548 to provide an enhanced sweeping effect. As in the embodiment of FIG. 3A, the shrouding gas flows into the annular space 458, 558 and out the other end of the shield 456, 556.

It can be seen from the foregoing description and the accompanying drawings that the present invention provides a novel apparatus for inhibiting the deposition of carbon soot on an electrode insulator in a plasma carburizing furnace. The electrode according to the present invention is designed to permit a dynamic gas flow in the electrode which produces a shrouding effect to keep carbon soot formed during the plasma carburizing process from building up on the surfaces of insulators in the electrode. Moreover, by use of a preferred gas, such as hydrogen, a plasma is less likely to form, thereby further inhibiting carbon soot buildup. A plasma carburizing furnace equipped with a gas shrouded electrode according to the present invention is essentially free from electrical short circuits across the electrode insulators resulting from carbon soot buildup.

It will be recognized by those skilled in the art that changes or modifications may be made to the above-described invention without departing from the broad inventive concepts of the invention. It is understood, therefore, that the invention is not limited to the particular embodiments disclosed herein, but is intended to cover all modifications and changes which are within the scope of the invention as defined in the appended claims.

What is claimed is:

1. In a plasma carburizing furnace having a rigid enclosure forming a vacuum chamber, means for heating the interior of the vacuum chamber, means for evacuating the vacuum chamber to a subatmospheric pressure, a first electrode, means for supplying a carburizing gas into the vacuum chamber, and means for supplying a d.c. voltage, a gas shrouded electrode and workpiece support comprising:

a support fixture mounted to the rigid enclosure inside the vacuum chamber;

a collar supported by said support fixture and having an end opening into the vacuum chamber;

a pedestal insulator disposed within said collar, said pedestal insulator having a portion that is dimensioned and positioned in said collar so as to provide a first annular space between said pedestal insulator and said collar, said portion having a top surface facing the vacuum chamber;

an elongated, conductive element extending from the end of said collar that opens into the vacuum chamber and supported by the top surface of said pedestal insulator such that said elongated, conductive element is electrically isolated from the first electrode; said elongated, conductive element being dimensioned and positioned within said collar so as to provide a second annular space between said elongated, conductive element and said collar, said second annular space connecting with the first annular space, said elongated, conductive element being dimensioned and positioned relative to said pedestal insulator so as to leave uncovered an annular area of the top surface of said pedestal insulator; and means for injecting a shrouding gas through said collar such that during a treatment cycle the shrouding gas flows through the first annular space, across the annular area of the top surface of said pedestal insulator, and through the second annular space toward the vacuum chamber, whereby a dynamic gas shroud is provided in said annular spaces and across the annular area of the top surface of said pedestal insulator.

2. Apparatus as recited in claim 1 further comprising a cylindrical shield surrounding a portion of said conductive element, said shield being dimensioned and positioned around said conductive element so as to provide a third annular space between said shield and said conductive element, said third annular space connecting with the second annular space and the vacuum chamber.

3. Apparatus as recited in claim 2 further comprising a cover mounted to said elongated, conductive element at a position adjacent to said shield, said cover being dimensioned and positioned relative to said shield a) so as to prevent carbon soot which forms in the vacuum chamber during operation of the plasma carburizing furnace from falling into the third annular space and b) so as to permit the shrouding gas to exit from the third annular space.

4. Apparatus as recited in claim 1 further comprising means for fastening said conductive element to the pedestal insulator.

5. Apparatus as recited in claim 1 wherein said collar has a radial hole therethrough having one end in communication with the first annular space; and said shrouding gas injection means comprises;

a source of pressurized gas; and a conduit for carrying gas from said source, said conduit being adapted to terminate in the radial hole of said collar, whereby gas can be injected into the first annular space.

6. Apparatus as recited in claim 5 wherein the radial hole in said collar is located adjacent the top surface of the pedestal insulator such that gas injected into the first annular space sweeps across the top surface of said pedestal insulator.

7. Apparatus as recited in claim 1 further comprising means for connecting said elongated, conductive element to the d.c. voltage supply means.

8. Apparatus as recited in claim 7 wherein said connecting means comprises:

a first bushing disposed through said collar, said first busing including a central conductor connected to said conductive element;

a second bushing disposed through the rigid enclosure of the furnace, said second bushing including a second central conductor connected to said first bushing; and a conductive lead connected between said first bushing and said second bushing.

9. A plasma carburizing furnace comprising:

a rigid enclosure forming a vacuum chamber, said enclosure being electrically connected so as to function as an anode;

means for heating the interior of the vacuum chamber;

means for evacuating the vacuum chamber to a subatmospheric pressure;

means for supplying a carburizing gas into the vacuum chamber;

an electrical power supply for supplying a negative d.c. voltage; and a gas shrouded electrode and workpiece support including a support fixture mounted to the rigid enclosure inside the vacuum chamber;

a collar supported by said support fixture and having an end opening into the vacuum chamber;

a pedestal insulator disposed within said collar, said pedestal insulator having a portion that is dimensioned and positioned in said collar so as to provide a first annular space between said pedestal insulator and said collar, said portion having a top surface facing the vacuum chamber;

an elongated, conductive element extending from the end of said collar that opens into the vacuum chamber and supported by the top surface of said pedestal insulator such that said elongated, conductive element is electrically isolated from said rigid enclosure; said elongated, conductive element being dimensioned and positioned within said collar so as to provide a second annular space between said elongated, conductive element and said collar, said second annular space having an end connecting with the first annular space, said elongated, conductive element being dimensioned and positioned relative to said pedestal insulator so as to leave uncovered an annular area of the top surface of said pedestal insulator; and means for injecting a shrouding gas through said collar such that during a treatment cycle the shrouding gas flows through the first annular space, across the annular area of the top surface of said pedestal insulator, and through the second annular space toward the vacuum chamber;

a cylindrical shield surrounding a portion of said conductive element, said shield being dimensioned and positioned around said conductive element so as to provide a third annular space between said shield and said conductive element, said third annular space connecting with the second annular space and the vacuum chamber; and a cover mounted to said elongated, conductive element at a position adjacent to said shield, said cover being dimensioned and positioned relative to said shield so as to prevent carbon soot which forms during operation of the plasma carburizing furnace from falling into the third annular space and so as to permit the shrouding gas to exit from the third annular space.

10. Apparatus as recited in claim 9 wherein said collar has a radial hole therethrough having one end in communication with the first annular space; and said shrouding gas injection means comprises:

a source of pressurized gas; and a conduit for carrying the shrouding gas from said source, said conduit being adapted to terminate in the radial hole of said collar, whereby the shrouding can be injected into the first annular space.

11. Apparatus as recited in claim 10 wherein the radial hole in said collar is located adjacent the top surface of the pedestal insulator such that gas injected into the first annular space sweeps across the top surface of said pedestal insulator.

12. Apparatus as recited in claim 9 further comprising means for connecting said elongated, conductive element to the d.c. voltage supply means.

13. Apparatus as recited in claim 12 wherein said connection means comprises:

a first bushing disposed through said collar, said first bushing including a central conductor connected to said conductive element;

a second bushing disposed through the rigid enclosure of the furnace, said second bushing including a second central conductor connected to said first bushing; and a conductive lead connected between said first bushing and said second bushing.

* * * * *

UNITED STATES PATENT AND TRADEMARK OFFICE
CERTIFICATE OF CORRECTION

PATENT NO. : 5,059,757

DATED : October 22, 1991

INVENTOR(S) : TREVOR J. LAW, RICHARD E. ANDREWS and CHRISTOPHER A. GALL

It is certified that error appears in the above-identified patent and that said Letters Patent is hereby corrected as shown below:

Column 7,

Line 12, "busing" should be --bushing--.

Signed and Sealed this

Twenty-second Day of June, 1993

*Attest:*

MICHAEL K. KIRK

*Attesting Officer*

*Acting Commissioner of Patents and Trademarks*